United States Patent

Huber et al.

[11] 3,904,860
[45] Sept. 9, 1975

[54] METHOD FOR DIAGNOSING THE CONDITION OF DATA PROCESSORS

[75] Inventors: Josef Huber; Gerd Steinmann, both of Munich, Germany

[73] Assignee: Siemens Aktiengesellschaft, Berlin & Munich, Germany

[22] Filed: Nov. 26, 1973

[21] Appl. No.: 419,088

[30] Foreign Application Priority Data

Dec. 14, 1972 Germany............................ 2261211

[52] U.S. Cl................. 235/153 AC; 235/153 AK; 340/172.5; 360/5
[51] Int. Cl... G06f 11/06; G01r 29/18; G05b 23/02
[58] Field of Search............... 235/153 AC, 153 AK; 340/172.5; 360/5, 39

[56] References Cited
UNITED STATES PATENTS
3,688,263   8/1972   Balogh et al................. 235/153 AK

*Primary Examiner*—Malcolm A. Morrison
*Assistant Examiner*—R. Stephen Dildine, Jr.

[57] ABSTRACT

A method for diagnosing the operating condition of data processors is described. Such data processors have at least one main memory over which processing units coact in cycles under the control of a program control unit. Control signals are generated in the processing unit for the purpose of executing instruction controlled routines in the control units of the processing units on the basis of the program being used. The control signals are transmitted to the individual registers forming register units in the processing unit for execution of elementary operations. The control signals for the individual elementary operations are recorded with reference to time in a logging device during the operation of the data processor and/or during the operation of a diagnostic routine. The contents of the logging device, so recorded, are then transferred to an area of the main memory in conjunction with the contents of corresponding registers in the register section.

7 Claims, 4 Drawing Figures

METHOD FOR DIAGNOSING THE CONDITION OF DATA PROCESSORS

BACKGROUND OF THE INVENTION

The invention relates to a method of facilitating a diagnosis of the condition of data processors having at least one main memory with which the processing units of the data processor coact in cycles under control of a program control unit, and in which actuating signals are generated for the purpose of executing instruction-controlled routines in the control units of the processing units.

In data processing technology it is common practice to start diagnostic programs upon the occurrence of malfunctions or errors, so as to obtain comparatively accurate information about defects. A criterion for the start of a diagnostic program may, for example, be obtained by comparing the results of two units operating in parallel.

Another common practice is to run programmed operating checks, by which the working order of the system is continuously checked. This has the advantage that a faulty operation of the system or of individual sections thereof can be recognized at an early stage. If a defect is detected during such a diagnostic routine, the accurate diagnosis of it is effected by means of the diagnostic routine.

Subroutines are started in the course of a diagnostic routine which lead to the processing of specific operations. On the basis of the results so obtained, which are compared with the known answers in a properly functioning storage unit, the defect can be located, even though the diagnostic check frequently has to be run more than once. A faulty section of the unit can then be repaired or exchanged, as necessary.

In data processing technology the general trend is toward increasing the "ip" time (i.e. mean time between failures: MTBF) and reducing to a minimum the diagnostic or waiting time (i.e. mean time to diagnosis: MTTD, or mean time to repair; MTTR), since during the diagnostic routine either the overall system or at least one section thereof is not available for the normal operation. Although, by improving the diagnostic program and the diagnostic routine itself, it is possible to reduce the time required for a diagnostic check such that in data processors in which the demands upon real-time operations are not excessive, a satisfactory ratio between MTBF and MTTD can be achieved. However, in data processors upon which excessive real-time demands are made such as, for example, in computerized switching systems, the diagnostic checks heretofore employed are unsatisfactory due to the comparatively long period of time required for a diagnostic process during which the system is not available with the full redundancy, that is, with all its subunits, for the normal operation.

As is generally known, diagnostic checks are based on the fact that the contents of individual registers in the data processor being diagnosed, which during the diagnostic routine are controlled in a specific way predetermined by the diagnostic program, are transferred to the storage. A diagnosis takes place by comparing the contents of the registers. In complex data processors wherein a register participates in the execution of several operations running sequentially, the diagnostic check requires frequent access to the registers so as to have available an adequate amount of information for an accurate error diagnosis.

It is an object of the invention to facilitate the diagnosis of the operating condition of a data processor in a manner as to reduce the time for the diagnosis, and yet to obtain a relatively accurate picture of the actual condition of the data processor, for example, the conditions determined during the program run of a diagnostic routine that cause the faulty operation.

SUMMARY OF THE INVENTION

The method according to the invention takes as a basis a data processor wherein all routines started in the course of the program are subdivided into subroutines, whereby within each subroutine control signals are transmitted in accordance with the program to the individual registers in the register section of a data processor from the control section of the data processor.

These signals serve for starting elementary operation in the register section of the processing unit. Elementary operations are understood to means the processes that are executed with those instructions occurring on the lowest rank of the instruction hierarchy. This principle offers the possibility that at the end of a subroutine a different routine is executed having a higher precedence or priority rating than the first routine in the course of which the first routine is interrupted. Within a given time, only one subroutine is operative and only control signals are provided for the elementary operations of one specific subroutine. If the starting point or the end of such a subroutine is called the breakpoint in a routine, each subroutine can be described by the execution of a series of characteristic elementary operations between two breakpoints.

Taking the foregoing as a basis, the invention is characterized by the fact that the actuating signals for the individual elementary operations are recorded with respect to time during the operation of the data processor and/or during the run of a diagnostic routine in a logging device. The contents of the logging device are transferred to an area of the main memory in conjunction with the contents of the corresponding register of the register section.

Depending on the duration of a subroutine, consecutive actuating signals can be provided in the time grid in which the routines are found. The elementary operations are logged in the manner specified by the invention. In this way, a picture with respect to time is obtained of the control signals actually provided and, thus, of the elementary operations. Thus, not only the contents of the individual registers of the register section of a processor are available for the diagnostic program, but also the control signals provided by the control section for the execution of elementary operations. Hence, by following the method according to the invention one has the advantage that the data available for a diagnostic program are more comprehensive than in prior art diagnostic methods, so that a diagnosis is processed more completely and more rapidly.

The information about the elementary operations in a subroutine is available in the logging device, and each element of information represents an actual answers are accepted in the usual manner by the main memory, that is, during a read-write operation. The main memory contains the known true answer in a specific memory location. The type and place of the malfunction can be determined by comparing the two answers.

The logging with respect to time of the control signals initiating the elementary operations may be effected continuously, i.e., even during the normal operation of the data processor. In this case always n last signal conditions of m control signals are stored in the logging device of the processing unit. This has the advantage that when defects occur suddenly, immediately upon the detection of a faulty operation, an accurate picture of the conditions prevailing at the time the defect appears is available, since not only the contents of the register, but also the information about the last elementary operations can be retrieved.

It is also possible, however, to initiate the logging only in case of need, for example, concurrently with the start of the run of a diagnostic routine. The recording with respect to time in this case being initiated with the beginning of the run of the diagnostic routine. This results primarily in the advantage that the load of the system is reduced.

BRIEF DESCRIPTION OF THE DRAWINGS

The principles of the invention will be more readily understood by reference to the description of a preferred embodiment given hereinbelow in conjunction with the accompanying drawings, wherein.

DETAILED DESCRIPTION OF THE DRAWINGS

Figure 1:
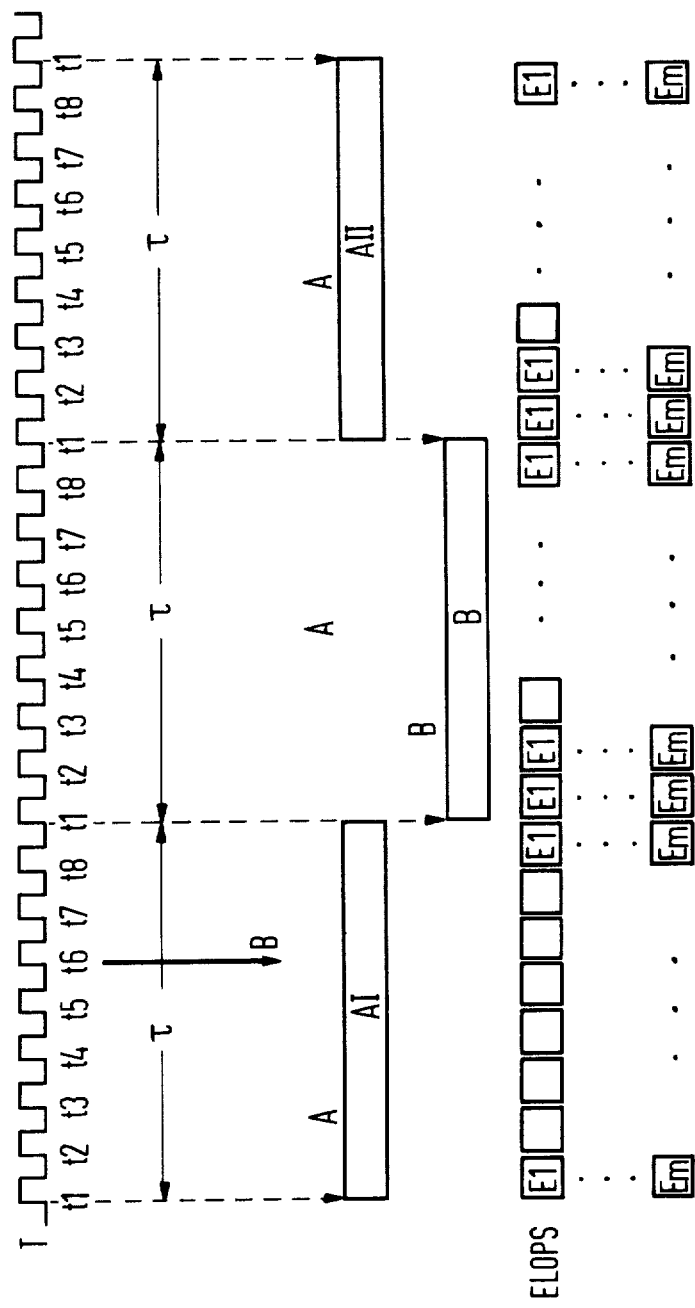
FIG. 1 is a time diagram illustrating a job sequence.

FIG. 1 shows a job sequence 18 in which a first routine A comprises the subroutines AI, AII, and in which during the first subroutine AI there arrives a request for a second routine B having a precedence rating higher than that of the ongoing routine A. The duration of each routine, or of each subroutine, is determined by the routine interval $\tau$ whose duration is either constant or is adjusted at the start of a routine to be logged.

The example shown in FIG. 1 comprises eight clock pulses of a clock T in the system. The breakpoints mentioned hereinabove occur at the end of a routine interval. At the end of the first subroutine AI, the latter is interrupted, and routine B is initiated. Since the latter is processed completely during a routine interval $\tau$, the routine A is again picked up at the end of the routine B, while at this stage the second subroutin AII is run. Within each subroutine AI and AII or within each routine B control signals are produced and transmitted for the execution of elementary operations. In FIG. 1 the elementary operations are labeled EI to Em. The time base for these elementary operations is determined by the time slot pattern of the clock T so that n accurately-known instants are obtained within a routine interval $\tau$. These are labeled $t1$ to $t8$ ($n = 8$) in FIG. 1. At each of the instants t1 to t8 a maximum of m control signals can be transmitted corresponding to $m$ elementary operations $EI$ to $Em$. For an explanation of the logging with respect to time of the elementary operations within a routine interval $\tau$ reference should be had to FIG. 2.

Figure 2:
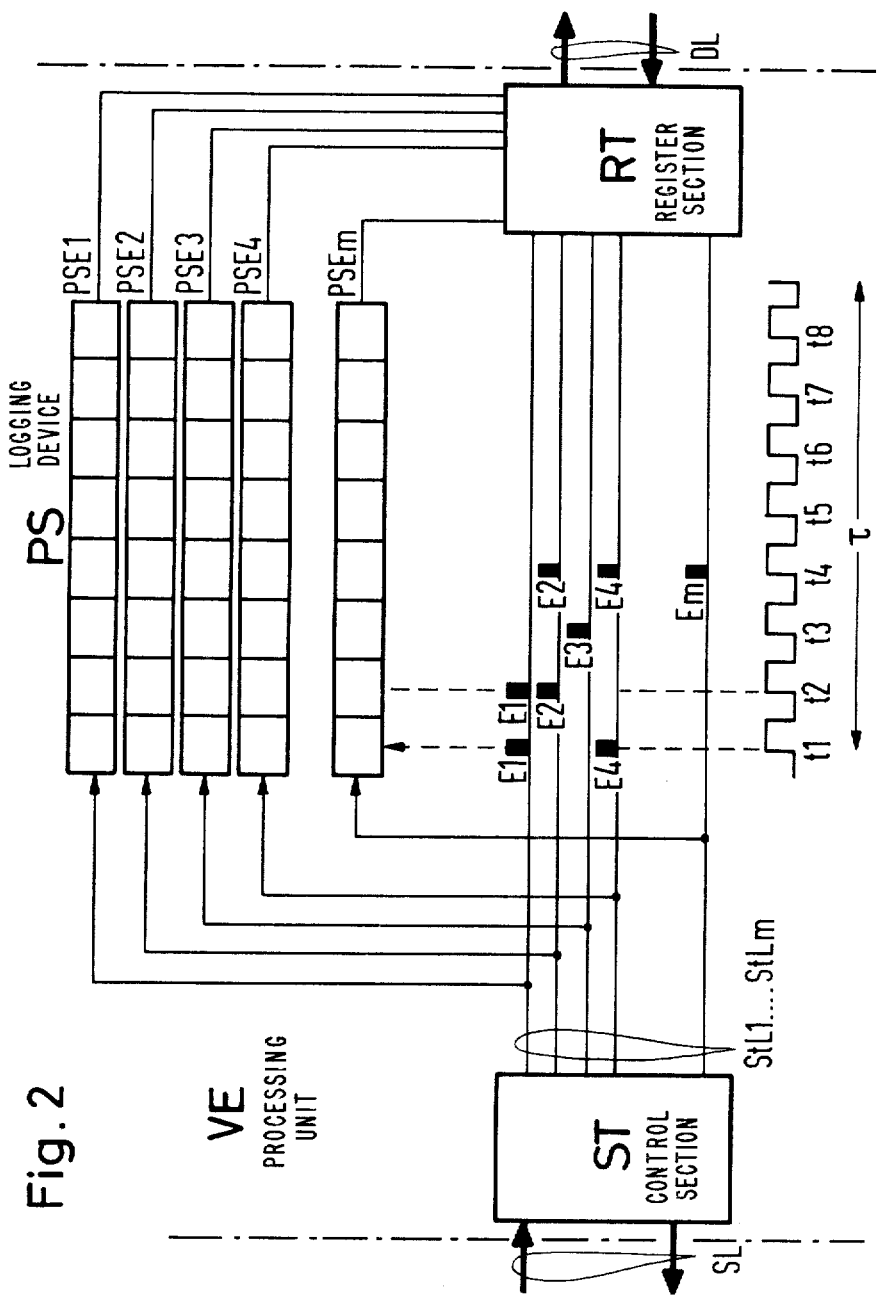
FIG. 2 is a schematic diagram illustrating a portion of a data processing unit to be diagnosed.

FIG. 2 shows a section of a processing unit VE in a data processor to be diagnosed. As commonly known in data processing technology, such a computer is made up of a control section ST and a register section RT. Aside from instruction decoders the control section ST comprises all control units for the processing units, that is, units with which a functional logic is coordinated. For example, the control section ST contains a control unit for the selection of cycle requests, whereby the precedence ratings allocated to said requests are taken into consideration. Furthermore, an instruction job control is provided by which control signals determined in accordance with the individual instructions of the program are produced. These individual instructions in turn, are transmitted to the register section RT via control lines $StL1$ to $StLm$ for the execution of elementary operations. The control units are not shown in detail in FIG. 2 in view of the fact that their construction is a part of the prior art and not essential to the invention described herein.

The register section contains the registers which are controllable by the control section ST in accordance with the job sequences to be run. Hence, it comprises all registers disposed in the processing unit and which are needed for handling the operation. For example, in the register section RT there are provided word input and word output registers, registers for receiving instruction data, counters, adders, etc. By way of example, the data transferred to the register section RT over the data line DL are input or read out from specific registers on the basis of certain control signals in specified registers. The construction of a register section is not shown in detail in view of its known character.

The transmission of the control signals between the control section ST and the register section RT takes place over m control lines $StL1$ to $StLm$. The control section ST is connected over signal lines SL and the register section RT is connected over data lines DL with the remaining units of the data processor, that is, with the main memory not shown herein and with the central program control unit also not shown herein.

A logging device PS is further provided which is connected at its input end to the control lines $StL1$ to $StLm$ and at its output end with the register section RT for the purpose of receiving the control signals to be logged In order to explain the method according to the invention, reference will be made hereinbelow to the elementary operations, although, strictly speaking, it is the control signals to which correspond specific elementary operations that are transmitted over the control lines.

In the example of FIG. 2, it is assumed that at the instant t1 within the first routine interval $\tau$, for example, two elementary operations E1 and E4 occur to which correspond control signals on the control lines StL1 and StL4.

These elementary operations are entered under control of the clock T, at the instant t1; into the positions PS E1 and PS E4 of the logging device PS. The elementary operations E1 and E2 occur at the instant t2. This information is placed at the instant $t2$ in the corresponding positions PS E1 and PS E2 of the logging device PS. In the manner described above this also occurs at the instant $t3$ at which only the elementary operation E3 occurs, at the instant $t4$ at which the elementary operations E2, E4 occur, and at the subsequent instants $t5$ to $t8$ at which further elementary operations not shown herein occur.

At the end of the routine interval τ shown in FIG. 2 which, for example, may be the routine interval of the first subroutine AI shown in FIG. 1, the logging device PS, therefore, contains a pulse diagram representing a pattern of all elementary operations occurring within this subroutine. This pulse diagram is now available for input to the main memory. An entry is made such that the contents of the logging device PS are transferred to the main memory over an output register of the register section RT where they are compared with a given pattern for purposes of evaluation. Subsequent to the logging of the elementary operations of a routine interval τ and after the acceptance by the storage the elementary operations of the next routine are logged. This may involve the logging of a second subroutine, or as shown in FIG. 1, the logging of the elementary operations of another higherorder routine.

Thus, as a supplement to the information about the register contents obtained on the basis of the various elementary operations within a routine or a subroutine, there is also available in the main memory the information about the control signals, that is, about the elementary operations within a routine or subroutine. The number of individual routines to be initiated by a diagnostic program is thus substantially smaller than in prior art diagnostic checks. Hence, the kind and location of a defect can be deduced more rapidly than has heretofore been possible with customary diagnostic methods.

A shift register can advantageously be employed as a logging device so that a simply allocation between the information to be logged and the instant to which it relates will result.

Since the number of all possible elementary operations occurring during the operation of a comparatively large data processor is great (several hundred) the recording of all elementary operations would require great expenditure primarily with respect to the capacity of the logging device. Therefore, in order to reduce such expenditure it is proposed within the framework of the invention to combine individual elementary operations into groups of elementary operations. By way of example, elementary operations that are mutually exclusive can be combined into one group.

Figure 3:
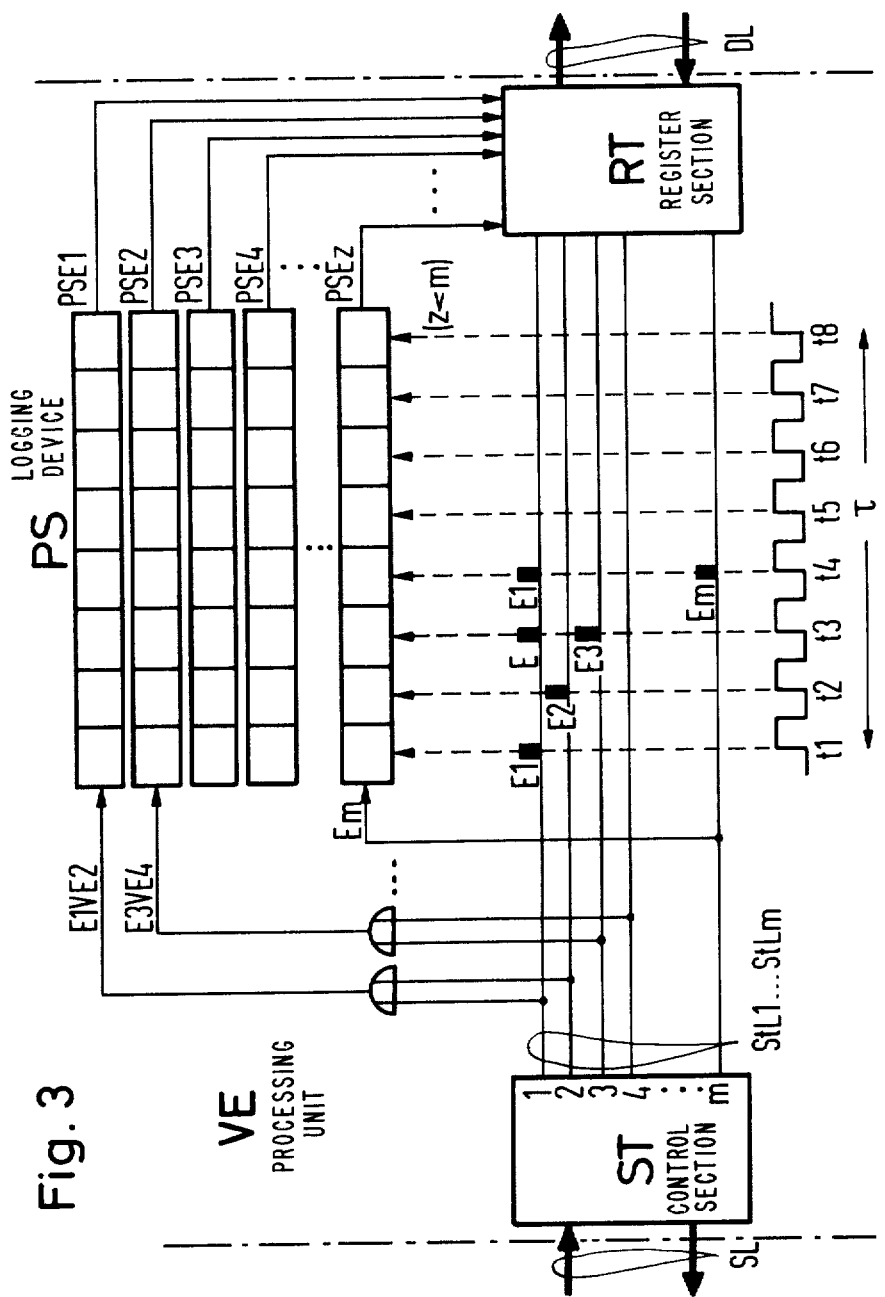
FIG. 3 is a schematic diagram of an alternative form of the FIG. 2 apparatus and FIG. 4 is a flow chart illustrating the steps to be performed in carrying out the method of the invention on the disclosed data processing apparatus.

This possibility is shown in FIG. 3 where again the control lines $StL1$ to $StLm$ running between the control section ST and the register section RT of a processing unit VE are shown. However, in this case the logging device PS contains only z storage locations, where $z>m$. During a routine interval τ, the control signals for the execution of the elementary operations are transmitted in the sequence shown in the example. Accordingly, the elementary operation E1 occurs at the instant t1, the elementary operation E2 at the instant t2, etc. Let it be assumed that in this example the elementary operations E1 and E2 and the elementary operations E3 and E4 are mutually exclusive (E1/E2; E3/E4). Thus, in this case the elementary operation groups E1 and E2, E3 and E4 can be entered, respectively into individual storage locations in the logging device PS without the necessity of taking special measures for subsequently processing the contents thereof. Similarly, other elementary operations can be combined so that ultimately the number of storage locations in the logging device PS, i.e., the number of storage locations of the shift register is smaller as compared with the example in FIG. 2 (Z<M).

It is also possible to group the elementary operations in a manner such that those occurring at the same instant within the time frame of a routine interval are combined. This will result in groups of elementary operations to which, for example, identical instants $t1$ and $t3$ are assigned to the time slot pattern of a routine interval.

According to a further feature of the invention, in order to also subject the logging device PS to an operation checkout in the course of a program designed therefor, 0 and 1 are alternately written into the logging device PS. The operability of the logging devices can be checked simply and adequately with a subsequently initiated transfer of the 0 and 1 alternately inserted into the main memory under control of the diagnostic program.

Thus far, the duration of a routine interval τ, throughout this discussion has been presumed to be constant. In the practical example, a routine interval τ always comprises eight clock pulses of the clock T. The method according to the invention is, however, not limited thereto. Thus, if the duration of a routine interval is variable, a counter counting the clock pulses of the clock T may be interrogated after a breakpoint has been reached, whereby the counter's registration can be adjusted at the start of a logging process.

Figure 4:
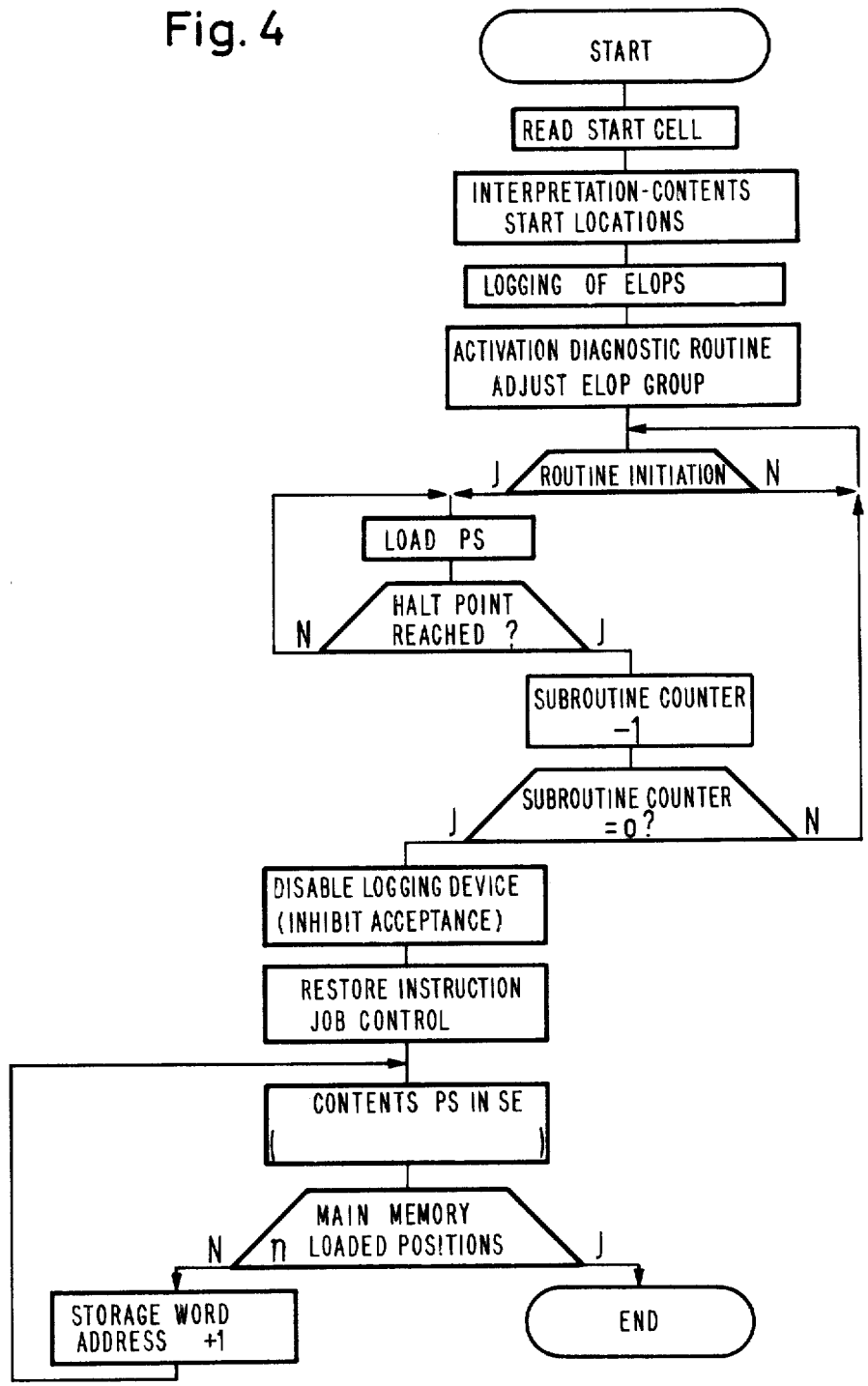

The processes during the logging of elementary operations will be explained hereinbelow by reference to a flow diagram in FIG. 4, it being assumed that the logging or recording of elementary operations is caused by a special diagnostic program.

Such a diagnostic is started by the central program of the data processor in a manner not shown herein ("START"). The start causes evaluation in the data processor VE being diagnosed of a cycle request supplied by the main memory with the start of the program. A permanently addressed storage location in the storage, the start cycle cell is reached and read ("READ START CELL") over an connection control in the control section of said processing unit ("READ START CYCLE LOCATION"). The contents of the start cycle location represent an instruction word on the basis of which it is recognized in another control section of the control unit that elementary operations of the following routine or routines shall be logged during a diagnostic routine ("INTERPRETATION CONTENTS START LOCATIONS;" "LOGGING OF ELOPS," "ACTIVATION DIAGNOSTIC ROUTINE"). If necessary, individual elementary operations may also be combined into groups of elementary operations as described hereinabove ("ADJUST ELOP GROUP"). After arrival of the routine initiation signal, which is rated in a program request control ("ROUTINE-INITIATION," left routine), all elementary operations occurring within the routine interval τ with the aid of which control signals supplied by the control section ST of the processing unit accordance with the program are loaded into the logging device PS ("LOAD PS"). At the end of a routine interval a check is made to see if a breakpoint indicated in the instruction word is reached ("BREAKPOINT REACHED?"). If so, the indication of a subroutine counter is lowered by 1 ("SUBROUTINE COUNTER −1"). The subroutine counter is adjusted accordingly at the start of the logging process with the aid of the instruction word that was accepted upon the reading of the start cycle location. If the subroutine counter has reached the indicaon 0 ("SUBROUTINE COUNTER =0?"), the logging device is disabled for accepting further elementary operations ("INHIBIT ACCEPTANCE"), the control in which the instruction routines take place in restored ("RESTORE INSTRUCTION JOB CONTROL") and the contents of the logging device PS are transferred to the storage SE ("CONTENTS PS IN SE"). In so doing, positions in the main memory can be loaded in accordance with n positions in the logging device. A logging process is terminated when the $n^{th}$ storage location has been loaded. In the other case, the storage word address is changed by increasing by 1 the indication of a counter ("STORAGE WORD ADDRESS+1"), and the process is repeated, that is, the contents of the logging device PS are now written into the next storage location of the storage.

In cases where after a breakpoint has been reached the subroutine counter has not attained the indication , a continuation routine is started, whereby again a routine is initiated so that further elementary operations — which, however, are now allocated to a subsequent subroutine — are entered in the logging device.

If after entering the elementary operations in the logging device the breakpoint specified in the instruction word has not been reached, the loading process for the logging device PS is restarted. A counter monitoring the pulses of the clock referenced hereinabove may be provided, which is likewise adjustable with the aid of the instruction word. In the FIG. 4 flow diagram the indication of the counter could be interrogated after the test as to whether a breakpoint is reached. The inclusion of a counter into the logging routine is advantageous for logging processes with variable subroutine location.

The method of the invention has been described by describing the steps to be performed, according to the principles of the invention, on exemplary apparatus. It is contemplated to be within the scope of the invention, as defined by the appended claims, that other forms of data processing apparatus and corresponding operational steps can be used.

We claim:

1. A method of operation of a data processing apparatus in order to carry out a diagnosis of its operating condition, said data processing apparatus having at least one main memory over which processing units react in cycles under control of a program control unit, said processng units generating control signals for executing instruction-controlled routines in accordance with the program being run, said control signals being transmitted to individual registers in register units in said processing units for the execution of elementary operations, the method comprising the steps of:

recording the said control signals for each said elementary operation, with reference to time, in a logging device during the operation of either a diagnostic routine, the operation of said data processing apparatus or both, and transferring the contents of said logging device to an area of said main memory in conjunction with the contents of corresponding registers in said register unit.

2. The method defined in claim 1 wherein said recording step occurs within a routine interval, whereby the elementary operations characteristic of a subroutine are entered into individual storage locations of said logging device and are stored therein as a pulse diagram characteristic of the subroutine.

3. The method defined in claim 2 comprising the additional steps of:

transferring said pulse diagram to said main memory as an "actual answer" at the end of a routine interval and comparing said "actual answer" to a "true answer" in said main memory.

4. The method defined in claim 1 comprising the additional steps of:

allocating in said logging device a particular storage location for each said elementary operation operation and storing the control signal for each said elementary operation in the said storage location allocated thereto.

5. The method defined in claim 4 wherein the recording of control signals corresponding to elementary operations is effected only by a diagnostic routine, a control instruction initiating said recording step being located in the start location of said diagnostic routine.

6. The method defined in claim 1 comprising the additional steps of:

combining control signals corresponding to mutually exclusive elementary operations into a group and storing said combined control signals in a common storage location in said logging device.

7. The method defined in claim 1 comprising the additional steps of:

combining control signals corresponding to identical elementary operations initiated at different instants of time within different routine intervals and storing said combined control signals in a common location of said storage device.

* * * * *